J. NELSON.
Truck.
No 13,600.
Patented Sept. 25, 1855.
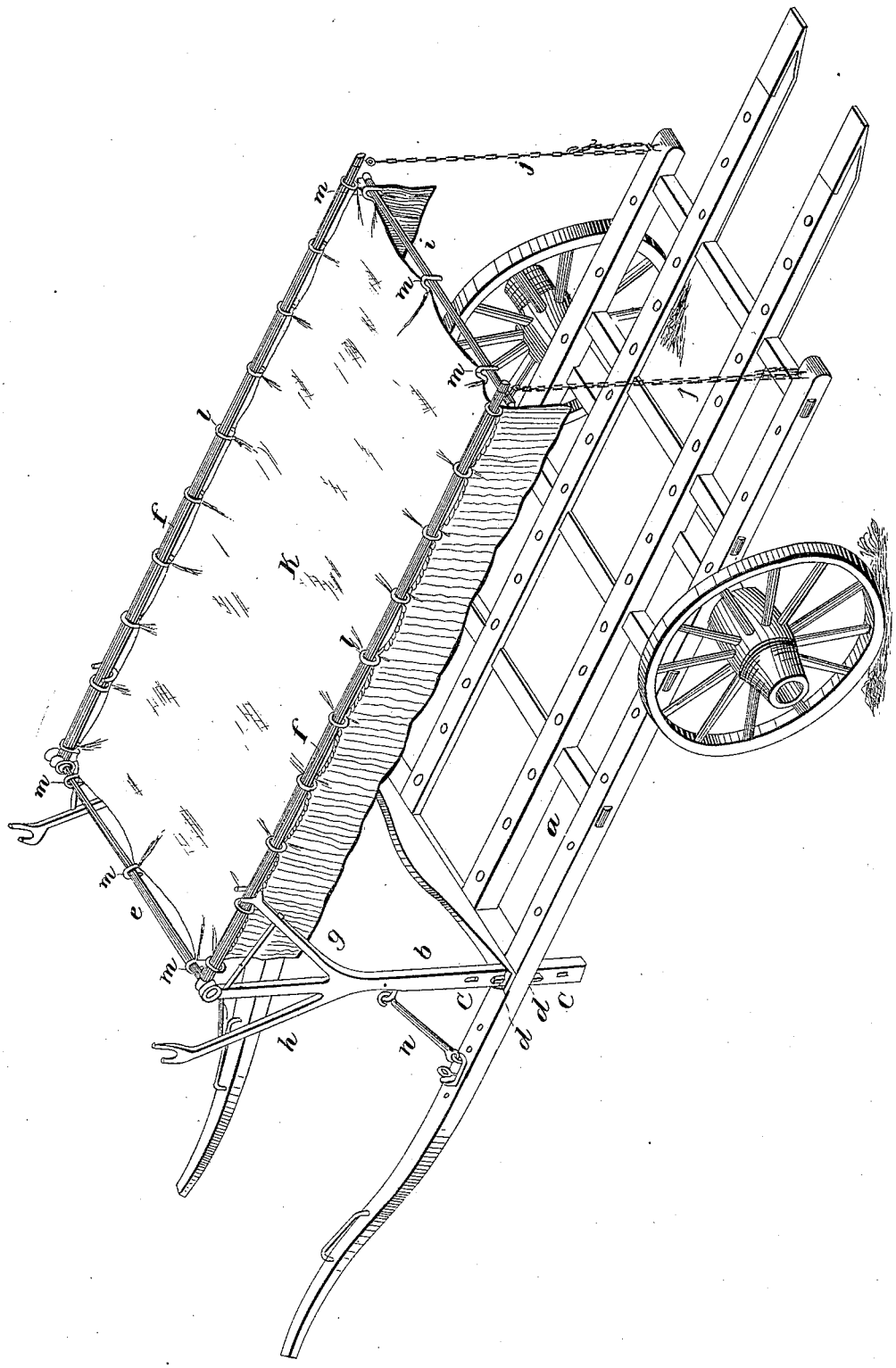

UNITED STATES PATENT OFFICE.

JACOB NELSON, OF CINCINNATI, OHIO.

AWNING FOR HORSE AND DRAY.

Specification of Letters Patent No. 13,600, dated September 25, 1855.

*To all whom it may concern:*

Be it known that I, JACOB NELSON, of Cincinnati, Hamilton county, Ohio, have invented a new and useful Combined Dray and Horse Canopy; and I do hereby declare the following to be a full, clear, and exact description thereof, reference being had to the annexed drawings, making a part of this specification, and in which my device is represented by a perspective view.

The object of my invention is to provide for drays and other open vehicles, a temporary shelter from the sun and rain, the same shelter, when not required to protect the load, being applicable to protect the team, as circumstances may render most desirable, the shelter being chiefly of service for the horse while standing awaiting a job and for the dray when loaded.

The apparatus here described I have been led to devise from my observations during many years experience as a steamboat mate. I have in the course of my daily occupation when in port seen many thousand dollars' worth of damage of the more destructible goods, such as butter, lard and salted meat by the heat and a great variety of merchandise by the rain. I have also observed the horses much oppressed by the heat, and, again, chilled by the rain during long standing when unemployed.

In the annexed drawings (*a*) represents a dray.

(*b*) are stanchions or posts, occupying sockets in or beside the thills or shafts, near to the head rail. These posts are pierced by a number of apertures (*c*) so as to enable them to be firmly secured by keys or wedges (*d*) at any desired height. The summits of these posts are joined by a rod (*e*) which forms the pivot by means of which a pair of booms or poles (*f*) are hinged to the posts. These poles, being capable of being swung either forward or backward at will, are supported so as to stretch horizontally either over the horse or dray, by means of forked branches or brackets (*g*, *h*), projecting from the posts. These poles are at their free extremities, held the proper distance apart, by means of a stretcher (*i*), which, resting by hooks within staples attached to the poles, is capable of being unshipped or shipped at pleasure. Chains or cords (*j*) attached at their upper ends to the poles, are passed down and made fast to the thills of the dray either at their shaft end or tail end as the case may be. A tarpaulin or awning (*k*) strung by means of rings (*l*) upon the poles and stretched fore and aft by hooks (*m*) engaging with the rod (*e*) and stretcher (*l*) affords the desired shelter.

(*n*) is a shifting brace.

The apparatus has been here described applied to a dray, but the plan is applicable to any open vehicle.

I claim as new and of my invention—

The portable and reversible dray and horse canopy, whose poles (*f*) are hinged at one end to posts (*b*), and supported in either the forward or backward position by branches or brackets (*g h*) projecting from the posts.

In testimony whereof, I hereunto set my hand before two subscribing witnesses.

JACOB NELSON.

Witnesses:
GEO. H. KNIGHT,
T. CRANE.